United States Patent
Friedman (10) Patent No.: US 8,947,511 B2
(45) Date of Patent: Feb. 3, 2015

(54) APPARATUS AND METHOD FOR PRESENTING THREE-DIMENSIONAL MEDIA CONTENT

(75) Inventor: Lee G. Friedman, Alpharetta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 606 days.

(21) Appl. No.: 12/896,809

(22) Filed: Oct. 1, 2010

(65) Prior Publication Data

US 2012/0081522 A1    Apr. 5, 2012

(51) Int. Cl.
*H04N 13/04* (2006.01)
*H04N 13/00* (2006.01)

(52) U.S. Cl.
CPC ......... *H04N 13/0022* (2013.01); *H04N 13/004* (2013.01); *H04N 13/0468* (2013.01); *H04N 13/0475* (2013.01)
USPC .......................................................... 348/51

(58) Field of Classification Search
None
See application file for complete search history.

(56) References Cited

U.S. PATENT DOCUMENTS

| | | | |
|---|---|---|---|
| 2,832,821 A | 4/1958 | Du Mont | |
| 4,649,425 A | 3/1987 | Pund | |
| 5,012,351 A | 4/1991 | Isono | |
| 5,293,529 A | 3/1994 | Yoshimura et al. | |
| 5,465,175 A | 11/1995 | Woodgate | |
| 6,014,164 A | 1/2000 | Woodgate | |
| 6,115,177 A | 9/2000 | Vossler | |
| 6,144,375 A | 11/2000 | Jain et al. | |
| 6,188,442 B1 | 2/2001 | Chandrasekhar | |
| 6,243,054 B1 | 6/2001 | DeLuca | |
| 6,285,368 B1 | 9/2001 | Sudo | |
| 6,535,241 B1 | 3/2003 | McDowall | |
| 6,559,813 B1 | 5/2003 | DeLuca | |
| 6,654,721 B2 | 11/2003 | Handelman | |
| 6,725,463 B1 | 4/2004 | Birleson | |
| 6,859,549 B1 | 2/2005 | Oliensis | |
| 6,924,833 B1 | 8/2005 | McDowall | |
| 6,965,381 B2 | 11/2005 | Kitamura | |
| 7,106,358 B2 | 9/2006 | Valliath et al. | |
| 7,204,592 B2 | 4/2007 | O'Donnell | |
| 7,391,443 B2 * | 6/2008 | Kojima et al. | 348/231.99 |
| 7,613,927 B2 | 11/2009 | Holovacs | |
| 7,813,543 B2 | 10/2010 | Modén | |
| 8,111,282 B2 | 2/2012 | Cutler et al. | |
| 8,117,281 B2 | 2/2012 | Robinson et al. | |
| 8,254,668 B2 | 8/2012 | Mashitani | |
| 8,305,914 B2 | 11/2012 | Thielman et al. | |

(Continued)

OTHER PUBLICATIONS

Edwards, "Active Shutter 3D Technology for HDTV", PhysOrg.com; 12 pages; Sep. 25, 2009; http://www.physorg.com/news173082582.html; web site last visited May 10, 2010.

*Primary Examiner* — Sath V Perungavoor
*Assistant Examiner* — Kate Luo
(74) *Attorney, Agent, or Firm* — Guntin & Gust, PLC; Joseph Hrutka (57) ABSTRACT

A system that incorporates teachings of the present disclosure may include, for example, a media processor including a controller to obtain three-dimensional media content, obtain position information associated with at least one viewer of a display device that is operably coupled to the media processor, adjust convergence of the three-dimensional media content based on the position information, and provide the three-dimensional media content with the adjusted convergence to the display device for presentation. Other embodiments are disclosed.

18 Claims, 9 Drawing Sheets

(56) References Cited

U.S. PATENT DOCUMENTS

| | | |
|---|---|---|
| 8,370,873 B2 | 2/2013 | Shintani |
| 8,416,278 B2 | 4/2013 | Kim et al. |
| 8,456,507 B1 | 6/2013 | Mallappa et al. |
| 8,675,067 B2 | 3/2014 | Chou et al. |
| 2002/0009137 A1 | 1/2002 | Nelson |
| 2002/0122145 A1 | 9/2002 | Tung |
| 2002/0122585 A1 | 9/2002 | Swift et al. |
| 2003/0043262 A1 | 3/2003 | Takemoto |
| 2003/0132951 A1 | 7/2003 | Sorokin et al. |
| 2003/0214630 A1 | 11/2003 | Winterbotham |
| 2003/0223499 A1 | 12/2003 | Routhier |
| 2003/0231179 A1 | 12/2003 | Suzuki |
| 2004/0027452 A1 | 2/2004 | Yun |
| 2004/0104864 A1 | 6/2004 | Nakada |
| 2004/0109093 A1 | 6/2004 | Small-Stryker |
| 2004/0218104 A1 | 11/2004 | Smith |
| 2005/0084006 A1 | 4/2005 | Lei |
| 2005/0123171 A1* | 6/2005 | Kobayashi et al. ............ 382/103 |
| 2005/0169553 A1 | 8/2005 | Maurer |
| 2005/0185711 A1 | 8/2005 | Pfister |
| 2005/0190180 A1* | 9/2005 | Jin et al. ........................ 345/419 |
| 2005/0270367 A1 | 12/2005 | McDowall |
| 2006/0046846 A1* | 3/2006 | Hashimoto ....................... 463/36 |
| 2006/0109200 A1 | 5/2006 | Alden |
| 2006/0161410 A1 | 7/2006 | Hamatani et al. |
| 2006/0203085 A1 | 9/2006 | Tomita |
| 2006/0252978 A1 | 11/2006 | Vesely |
| 2006/0274197 A1 | 12/2006 | Yoo |
| 2007/0039032 A1 | 2/2007 | Goldey et al. |
| 2007/0081716 A1 | 4/2007 | Ha |
| 2007/0153122 A1 | 7/2007 | Ayite |
| 2007/0242068 A1 | 10/2007 | Han |
| 2007/0263003 A1 | 11/2007 | Ko |
| 2007/0266412 A1 | 11/2007 | Trowbridge |
| 2007/0296721 A1* | 12/2007 | Chang et al. ................... 345/427 |
| 2008/0024454 A1 | 1/2008 | Everest |
| 2008/0044079 A1 | 2/2008 | Chao et al. |
| 2008/0062125 A1 | 3/2008 | Kitaura |
| 2008/0080852 A1 | 4/2008 | Chen |
| 2008/0100547 A1* | 5/2008 | Cernasov ......................... 345/87 |
| 2008/0199070 A1* | 8/2008 | Kim et al. ...................... 382/154 |
| 2008/0247610 A1 | 10/2008 | Tsunoda |
| 2008/0256572 A1 | 10/2008 | Chen |
| 2008/0303896 A1 | 12/2008 | Lipton |
| 2008/0310499 A1 | 12/2008 | Kim |
| 2009/0100474 A1 | 4/2009 | Migos |
| 2009/0122134 A1* | 5/2009 | Joung et al. ....................... 348/42 |
| 2009/0128620 A1 | 5/2009 | Lipton |
| 2009/0160934 A1 | 6/2009 | Hendrickson et al. |
| 2009/0174708 A1 | 7/2009 | Yoda et al. |
| 2009/0278917 A1 | 11/2009 | Dobbins et al. |
| 2009/0310851 A1 | 12/2009 | Arcas et al. |
| 2009/0315977 A1 | 12/2009 | Jung |
| 2009/0319178 A1 | 12/2009 | Khosravy |
| 2010/0007582 A1 | 1/2010 | Zalewski |
| 2010/0013738 A1 | 1/2010 | Covannon |
| 2010/0039428 A1 | 2/2010 | Kim et al. |
| 2010/0045772 A1 | 2/2010 | Roo et al. |
| 2010/0045779 A1 | 2/2010 | Kwon |
| 2010/0066816 A1 | 3/2010 | Kane |
| 2010/0073468 A1 | 3/2010 | Kutner |
| 2010/0076642 A1 | 3/2010 | Hoffberg |
| 2010/0079585 A1 | 4/2010 | Nemeth |
| 2010/0085424 A1 | 4/2010 | Kane et al. |
| 2010/0086200 A1 | 4/2010 | Stankiewicz et al. |
| 2010/0098299 A1 | 4/2010 | Muquit et al. |
| 2010/0103106 A1* | 4/2010 | Chui ............................. 345/166 |
| 2010/0114783 A1 | 5/2010 | Spolar |
| 2010/0134411 A1 | 6/2010 | Tsumura |
| 2010/0150523 A1 | 6/2010 | Okubo |
| 2010/0171697 A1* | 7/2010 | Son et al. ....................... 345/158 |
| 2010/0177161 A1 | 7/2010 | Curtis |
| 2010/0177172 A1 | 7/2010 | Ko |
| 2010/0182404 A1 | 7/2010 | Kuno |
| 2010/0188488 A1 | 7/2010 | Birnbaum et al. |
| 2010/0188511 A1 | 7/2010 | Matsumoto |
| 2010/0192181 A1 | 7/2010 | Friedman |
| 2010/0194857 A1 | 8/2010 | Mentz |
| 2010/0199341 A1 | 8/2010 | Foti et al. |
| 2010/0201790 A1 | 8/2010 | Son |
| 2010/0215251 A1 | 8/2010 | Klein Gunnewiek et al. |
| 2010/0225576 A1 | 9/2010 | Morad |
| 2010/0225735 A1 | 9/2010 | Shaffer et al. |
| 2010/0226288 A1 | 9/2010 | Scott et al. |
| 2010/0235871 A1 | 9/2010 | Kossin |
| 2010/0303442 A1 | 12/2010 | Newton et al. |
| 2010/0306800 A1 | 12/2010 | Jung et al. |
| 2010/0309287 A1 | 12/2010 | Rodriguez |
| 2011/0001806 A1 | 1/2011 | Nakahata |
| 2011/0012896 A1 | 1/2011 | Ji |
| 2011/0012992 A1 | 1/2011 | Luthra |
| 2011/0032328 A1 | 2/2011 | Raveendran |
| 2011/0037837 A1 | 2/2011 | Chiba et al. |
| 2011/0043614 A1 | 2/2011 | Kitazato |
| 2011/0050860 A1 | 3/2011 | Watson |
| 2011/0050866 A1 | 3/2011 | Yoo |
| 2011/0050869 A1 | 3/2011 | Gotoh |
| 2011/0078737 A1 | 3/2011 | Kanemaru |
| 2011/0096155 A1 | 4/2011 | Choo |
| 2011/0109715 A1 | 5/2011 | Jing et al. |
| 2011/0119640 A1 | 5/2011 | Berkes |
| 2011/0119709 A1 | 5/2011 | Kim et al. |
| 2011/0122152 A1 | 5/2011 | Glynn |
| 2011/0128354 A1 | 6/2011 | Tien et al. |
| 2011/0138334 A1 | 6/2011 | Jung |
| 2011/0157329 A1 | 6/2011 | Huang et al. |
| 2011/0164110 A1 | 7/2011 | Fortin et al. |
| 2011/0164122 A1 | 7/2011 | Hardacker |
| 2011/0193946 A1 | 8/2011 | Apitz |
| 2011/0199460 A1 | 8/2011 | Gallagher |
| 2011/0199469 A1 | 8/2011 | Gallagher |
| 2011/0211049 A1 | 9/2011 | Bassali et al. |
| 2011/0221874 A1 | 9/2011 | Oh |
| 2011/0225611 A1 | 9/2011 | Shintani |
| 2011/0228040 A1 | 9/2011 | Blanche et al. |
| 2011/0254921 A1 | 10/2011 | Pahalawatta |
| 2011/0255003 A1 | 10/2011 | Pontual |
| 2011/0258665 A1 | 10/2011 | Fahrny et al. |
| 2011/0267439 A1 | 11/2011 | Chen |
| 2011/0271304 A1 | 11/2011 | Loretan |
| 2011/0285828 A1 | 11/2011 | Bittner |
| 2011/0286720 A1 | 11/2011 | Obana et al. |
| 2011/0298803 A1 | 12/2011 | King et al. |
| 2011/0301760 A1 | 12/2011 | Shuster et al. |
| 2011/0304613 A1 | 12/2011 | Thoresson |
| 2011/0310234 A1 | 12/2011 | Sarma |
| 2012/0007948 A1 | 1/2012 | Suh et al. |
| 2012/0026396 A1 | 2/2012 | Banavara |
| 2012/0033048 A1 | 2/2012 | Ogawa |
| 2012/0050507 A1 | 3/2012 | Keys |
| 2012/0092445 A1 | 4/2012 | McDowell et al. |
| 2012/0169730 A1 | 7/2012 | Inoue |
| 2012/0169838 A1 | 7/2012 | Sekine |
| 2012/0249719 A1 | 10/2012 | Lemmey et al. |
| 2012/0274731 A1 | 11/2012 | Shanmukhadas et al. |

* cited by examiner

APPARATUS AND METHOD FOR PRESENTING THREE-DIMENSIONAL MEDIA CONTENT

FIELD OF THE DISCLOSURE

The present disclosure relates generally to media content communication and more specifically to an apparatus and method for presenting three-dimensional media content.

BACKGROUND

Media consumption has become a multibillion dollar industry that continues to grow rapidly. High resolution displays such as high definition televisions and high resolution computer monitors can now present two-dimensional movies and games with three-dimensional perspective with clarity never seen before. Collectively, improvements in viewing, audio, and communication technologies are causing rapid demand for consumption of all types of media content. However, viewers have differing preferences and perceptions as to media content.

DETAILED DESCRIPTION

The present disclosure describes, among other things, illustrative embodiments of methods and devices for calibrating the presentation of three-dimensional (3D) content. The calibration can be an adjustment of the convergence of the 3D images based on the viewers to whom the 3D content is going to be presented. In one embodiment, the adjustment of the convergence can be performed by a media processor (such as a set top box), a television and/or by another display device. In another embodiment, the adjustment to the convergence can be based on a number of factors, including the position or distance of one or more viewers from the device presenting the content. In another embodiment, the adjustment to the convergence can be based on an outlay of a room, without accounting for the individuals therein, such as based on identified seating arrangements. In yet another embodiment, the adjustment to the convergence can be based on individual or group preferences. In one embodiment, the calibration can be a non-continuous process, such as occurring at the beginning of presentation of 3D media content. Other embodiments are also contemplated.

One embodiment of the present disclosure can entail a media processor that includes a controller to obtain three-dimensional media content and to obtain position information associated with at least one viewer of a display device that is operably coupled to the media processor. The controller can also be programmed to adjust convergence of the three-dimensional media content based on the position information and provide the three-dimensional media content with the adjusted convergence to the display device for presentation.

One embodiment of the present disclosure can entail a non-transitory computer-readable storage medium which includes computer instructions to obtain a distance between at least one viewer and a display device using a calibrator. The computer instructions can also adjust convergence of three-dimensional media content based on the distance and to provide the three-dimensional media content with the adjusted convergence to the display device for presentation.

One embodiment of the present disclosure can entail a method including obtaining three-dimensional media content at a media device and obtaining position information associated with at least one viewer of a display device that is operably coupled to the media processor. The method can also include adjusting the three-dimensional media content based on the position information and providing the adjusted three-dimensional media content to the display device for presentation.

Figure 1:
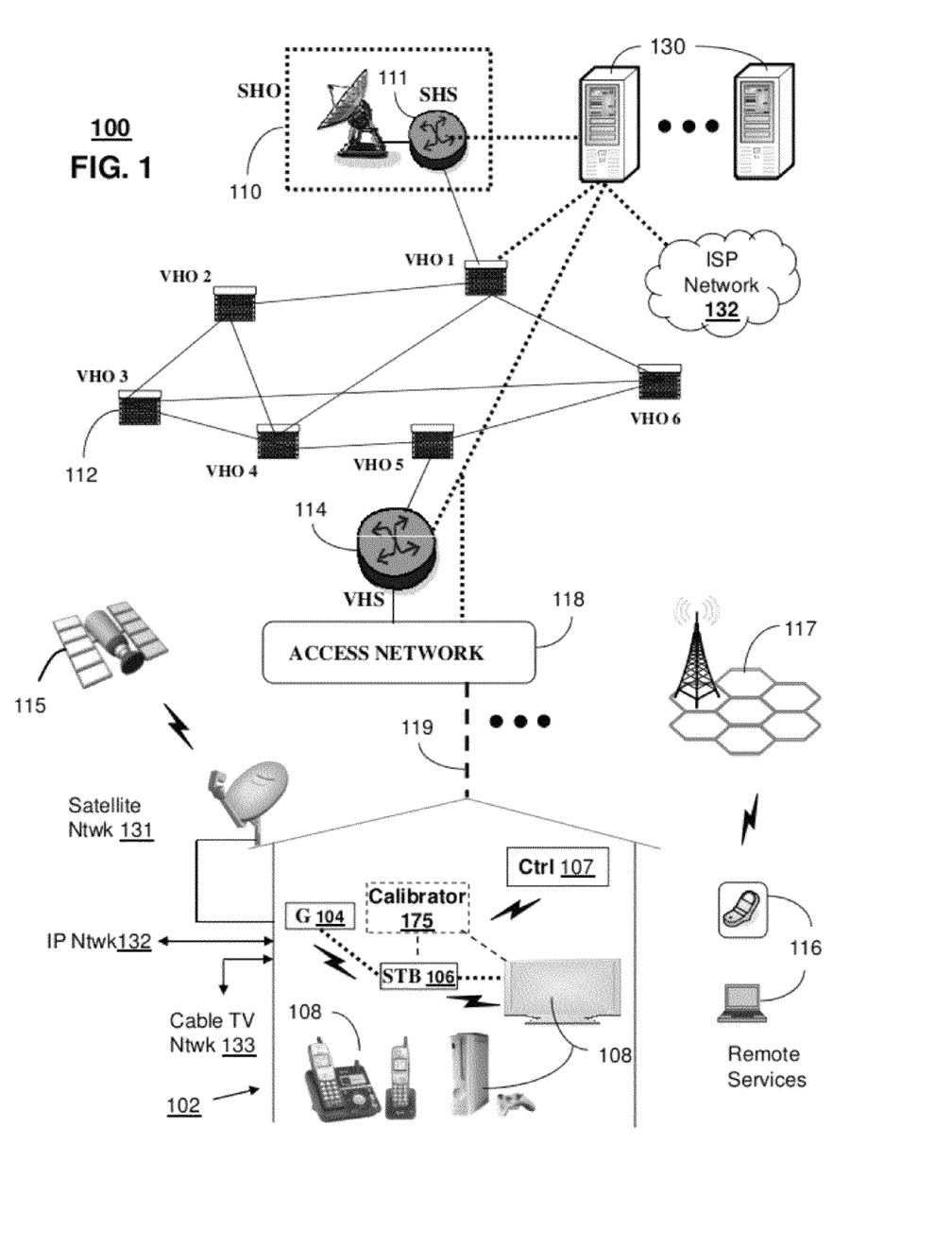
FIG. 1 depicts an illustrative embodiment of a communication system that provides media services.

FIG. 1 depicts an illustrative embodiment of a first communication system 100 for delivering media content, which can include 3D media content. The communication system 100 can represent an Internet Protocol Television (IPTV) broadcast media system although other media broadcast systems are contemplated by the present disclosures. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) or gaming consoles (e.g., PS3, Xbox or Wii) which in turn present broadcast channels to media devices 108 such as computers, television sets, managed in some instances by a media controller 107 (such as an infrared or RF remote control, gaming controller, etc.).

The gateway 104, the media processors 106, and media devices 108 can utilize tethered interface technologies (such as coaxial, phone line, or powerline wiring) or can operate over a common wireless access protocol such as Wireless Fidelity (WiFi). With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 (e.g., cellular phone, laptop computer, etc.) by way of a wireless access base station 117 operating according to common wireless access protocols such as WiFi, or cellular communication technologies (such as GSM, CDMA, UMTS, WiMAX, Software Defined Radio or SDR, and so on).

A satellite broadcast television system can be used in place of the IPTV media system. In this embodiment, signals transmitted by a satellite 115 carrying media content can be intercepted by a common satellite dish receiver 131 coupled to the building 102. Modulated signals intercepted by the satellite dish receiver 131 can be transferred to the media processors 106 for decoding and distributing broadcast channels to the media devices 108. The media processors 106 can be equipped with a broadband port to the IP network 132 to enable services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It is contemplated that the present disclosure can apply to any present or next generation over-the-air and/or landline media content services system. In one embodiment, an IP Multimedia Subsystem (IMS) network architecture can be utilized to facilitate the combined services of circuit-switched and packet-switched systems in delivering the media content to one or more viewers.

System 100 can provide 3D content to the building 102 for presentation and/or can provide 2D content that can be rendered into 3D content by one or more client devices, such as the STB 106 of the TV 108. The three-dimensional image content can be based upon various three-dimensional imaging techniques, including polarization, anaglyphics, active shuttering (such as alternate frame sequencing), autostereoscopy, and so forth.

In one embodiment, system 100 can include a calibrator 175 that adjusts the presentation of the 3D content. The adjustment can be of the convergence of the 3D images, such as the amount of overlap of the left and right eye image pairs, and can be based on a number of factors. For instance, the calibrator 175 can include components for determining information of one or more viewers with respect to the display device 108. Based on that position information (such as a distance from the display device 108), the calibrator 175 can adjust the convergence of the 3D images, such as by utilizing a look-up table for distance versus convergence factors or by using a convergence algorithm. In one embodiment, the controller 107 can include a calibration key, which when depressed, commences the gathering of position information and the adjustment of the 3D content. The adjustment can occur once, such as prior to commencing the media content and/or can occur at other times. In one embodiment, the calibration is a non-continuous process, although the present disclosure contemplates a continuous process being implemented for certain situations. In one embodiment, the calibrator 175 can be incorporated into one of the STB 106 or the display device 108, and/or can include measuring devices such as a distance camera for determining the position information.

Figure 2:
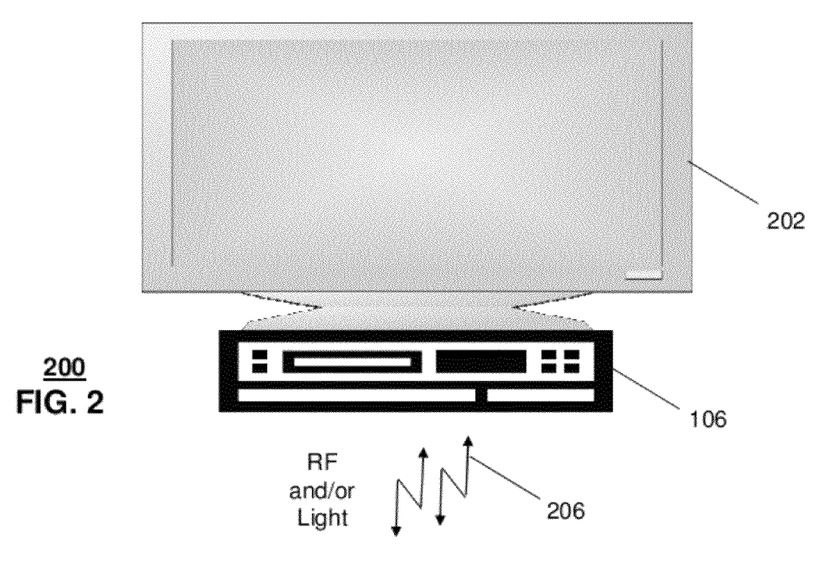
FIG. 2 depicts an illustrative embodiment of a presentation device and media processor for presenting media content that can be used in the system of FIG. 1.

FIG. 2 depicts an illustrative embodiment of a presentation device 202 and media processor 106 for presenting media content in a communication system 200, which can be incorporated into system 100 of FIG. 1. One or both of the presentation device 202 and the media processor 106 can include the calibrator 175 that provides for adjustment of 3D media content based on position information associated with viewers. In the present illustration, the presentation device 202 is depicted as a television set. It will be appreciated that the presentation device 202 alternatively can represent a portable communication device such as a cellular phone, a PDA, a computer, or other computing device with the ability to display media content. The media processor 106 can be an STB such as illustrated in FIG. 1, or some other computing device such as a cellular phone, computer, gaming console, or other device that can process and direct the presentation device 202 to present images associated with media content. It is further noted that the media processor 106 and the presentation device 202 can be an integral unit. For example, a computer or cellular phone having computing and display resources collectively can represent the combination of a presentation device 202 and media processor 106.

Figure 3:
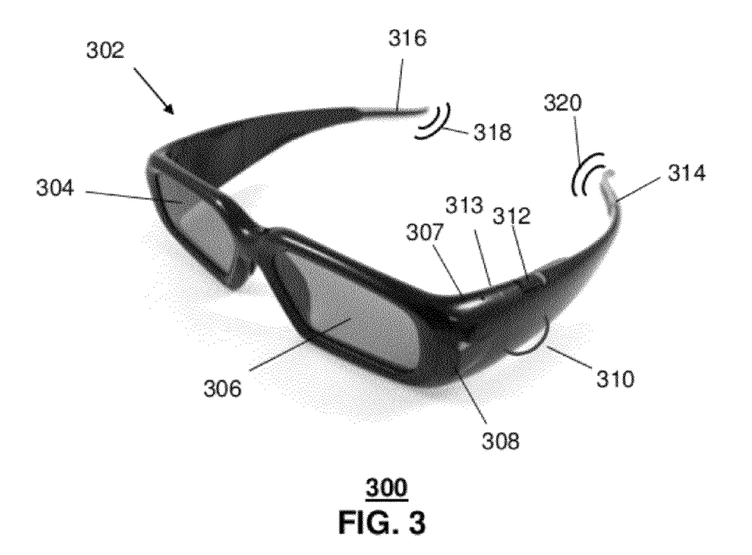
FIG. 3 depicts an illustrative embodiment of a viewing apparatus that can be used with FIG. 2.

The media processor 106 can be adapted to communicate with accessories such as the viewing apparatus 300 of FIG. 3 by way of a wired or wireless interface, such as through RF and/or light waves 206. The communication can be one-way and/or two-way communication, such as providing the viewing apparatus 300 with a transceiver 302. A wired interface can represent a tethered connection from the viewing apparatus 300 to an interface of the media processor (e.g., USB or proprietary interface). A wireless interface can represent a radio frequency (RF) interface such as Bluetooth, WiFi, Zigbee or other wireless standard. The wireless interface can also represent an infrared communication interface. Any standard or proprietary wireless interface between the media processor 106 and the viewing apparatus 300 is contemplated by the presented disclosure.

The viewing apparatus 300 can represent an apparatus for viewing two-dimensional or 3D stereoscopic images which can be still or moving images. The viewing apparatus 300 can be an active shutter viewing apparatus. In this embodiment, each lens has a liquid crystal layer which can be darkened or made to be transparent by the application of one or more bias voltages. Each lens 304, 306 can be independently controlled. Accordingly, the darkening of the lenses can alternate, or can be controlled to operate simultaneously.

Each viewing apparatus 300 can include various components associated with a communication device including a wireline and/or wireless transceiver 302 (herein transceiver 302), a user interface (UI), a power supply, a location detector, and a controller 307 for managing operations thereof. The transceiver 302 can support short-range or long-range wireless access technologies such as infrared, Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 302 can also be adapted to support circuit-switched wireline access technologies (such as PSTN), packet-switched wireline access technologies (such as TCPIP, VoIP, etc.), and combinations thereof.

The UI can include a depressible or touch-sensitive keypad with a navigation mechanism such as a roller ball, joystick, mouse, or navigation disk for manipulating operations of the communication device 300. The keypad can be an integral part of a housing assembly of the apparatus 300 or an independent device operably coupled thereto by a tethered wireline interface (such as a USB cable) or a wireless interface supporting for example Bluetooth. The keypad can represent a numeric dialing keypad commonly used by phones, and/or a Qwerty keypad with alphanumeric keys. The UI can further include a display such as monochrome or color LCD (Liquid Crystal Display), OLED (Organic Light Emitting Diode) or other suitable display technology for conveying images to an end user of the apparatus 300. In an embodiment where the display is touch-sensitive, a portion or all of the keypad 308 can be presented by way of the display.

The UI can also include an audio system 312 that utilizes common audio technology for conveying low volume audio (such as audio heard only in the proximity of a human ear) and high volume audio for hands free operation. The audio system 312 can further include a microphone for receiving audible signals of an end user. The audio system 312 can also be used for voice recognition applications. The UI can further include an image sensor such as a charged coupled device (CCD) camera for capturing still or moving images.

The power supply can utilize common power management technologies such as replaceable and rechargeable batteries, supply regulation technologies, and charging system technologies for supplying energy to the components of the apparatus 300 to facilitate long-range or short-range portable applications. The location detector can utilize common location technology such as a global positioning system (GPS) receiver for identifying a location of the communication device 300 based on signals generated by a constellation of GPS satellites, thereby facilitating common location services such as navigation.

The transceiver 302 can also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

In one embodiment, the viewing apparatus 300 can utilize a receiver portion of the transceiver 302 in the form of an infrared. Alternatively, the viewing apparatus 300 can function as a two-way communication device, in which case a full infrared transceiver could be utilize to exchange signals between the media processor 106 and the viewing apparatus 300.

The viewing apparatus 300 can utilize a controller 307 to control operations thereof, and a portable power supply (not shown). The viewing apparatus 300 can have portions of a UI. For example, the viewing apparatus 300 can have a multipurpose button 312 which can function as a power on/off button and as a channel selection button. A power on/off feature can be implemented by a long-duration depression of button 312 which can toggle from an on state to an off state and vice-versa. Fast depressions of button 312 can be used for channel navigation. Alternatively, two buttons can be added to the viewing apparatus 300 for up/down channel selection, which operate independent of the on/off power button 312. In another embodiment, a thumbwheel can be used for scrolling between channels.

The viewing apparatus 300 can also include an audio system 313 with one or more speakers in the extensions of the housing assembly such as shown by references 314, 316 to produce localized audio 318, 320 near a user's ears. Different portions of the housing assembly can be used to produce mono, stereo, or surround sound effects. Ear cups (not shown) such as those used in headphones can be used by the viewing apparatus 300 (as an accessory or integral component) for a more direct and low-noise audio presentation technique. The volume of sound presented by the speakers 314, 316 can be controlled by a thumbwheel 310 (or up/down buttons—not shown).

It would be evident from the above descriptions that many embodiments of the viewing apparatus 300 are possible, all of which are contemplated by the present disclosure. In one embodiment, the viewing apparatus 300 can be utilized as part of the calibration process. For instance, the button 312 can function as a calibration request that is forwarded to one or all of the calibrator 175, the media receiver 106 and the TV 108. In another embodiment, the transceiver 302 of the viewing apparatus 300 can provide signals to the calibrator 175 for generating or otherwise obtaining positioning information associated with the viewer wearing the viewing apparatus 300. As described above, the position information can then be used for adjusting the convergence of the 3D image content. The signals transmitted can be of various forms. For instance, the viewing apparatus 300 can determine the position information and transmit the data directly to the device that will adjust the convergence, such as the calibrator 175, the media receiver 106 or the TV 108. In another embodiment, the viewing apparatus 300 can provide signals from which the position information can be determined by the calibrator 175, the media receiver 106 or the TV 108.

Figure 4:
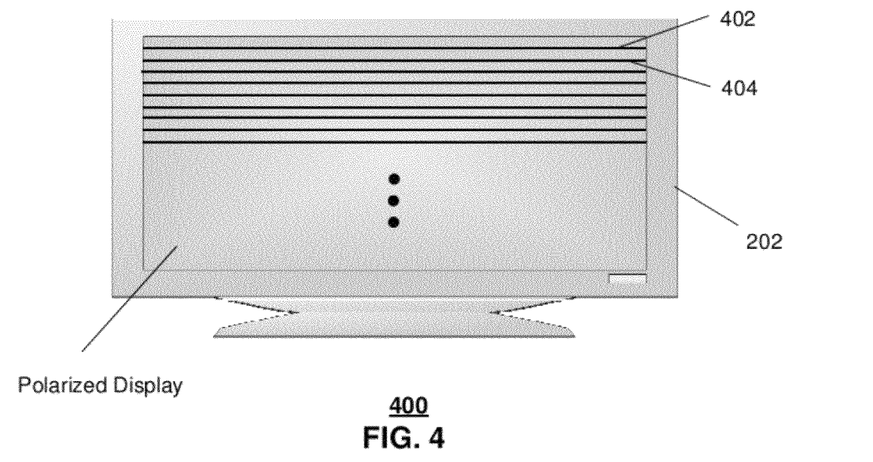
FIG. 4 depicts an illustrative embodiment of a presentation device with a polarized display that can be used in the system of FIG. 1.

FIG. 4 depicts an illustrative embodiment of a presentation device 402 with a polarized display. A display can be polarized with well-known polarization filter technology so that alternative horizontal pixel rows can be made to have differing polarizations. For instance, odd horizontal pixels 402 can be polarized for viewing with one polarization filter, while even horizontal pixels 404 can be polarized for viewing with an alternative polarization filter. The viewing apparatus 300 previously described can be adapted to have one lens polarized for odd pixel rows, while the other lens is polarized for viewing even pixel rows. With polarized lenses, the viewing apparatus 300 can present a user a 3D stereoscopic image.

Figure 5:
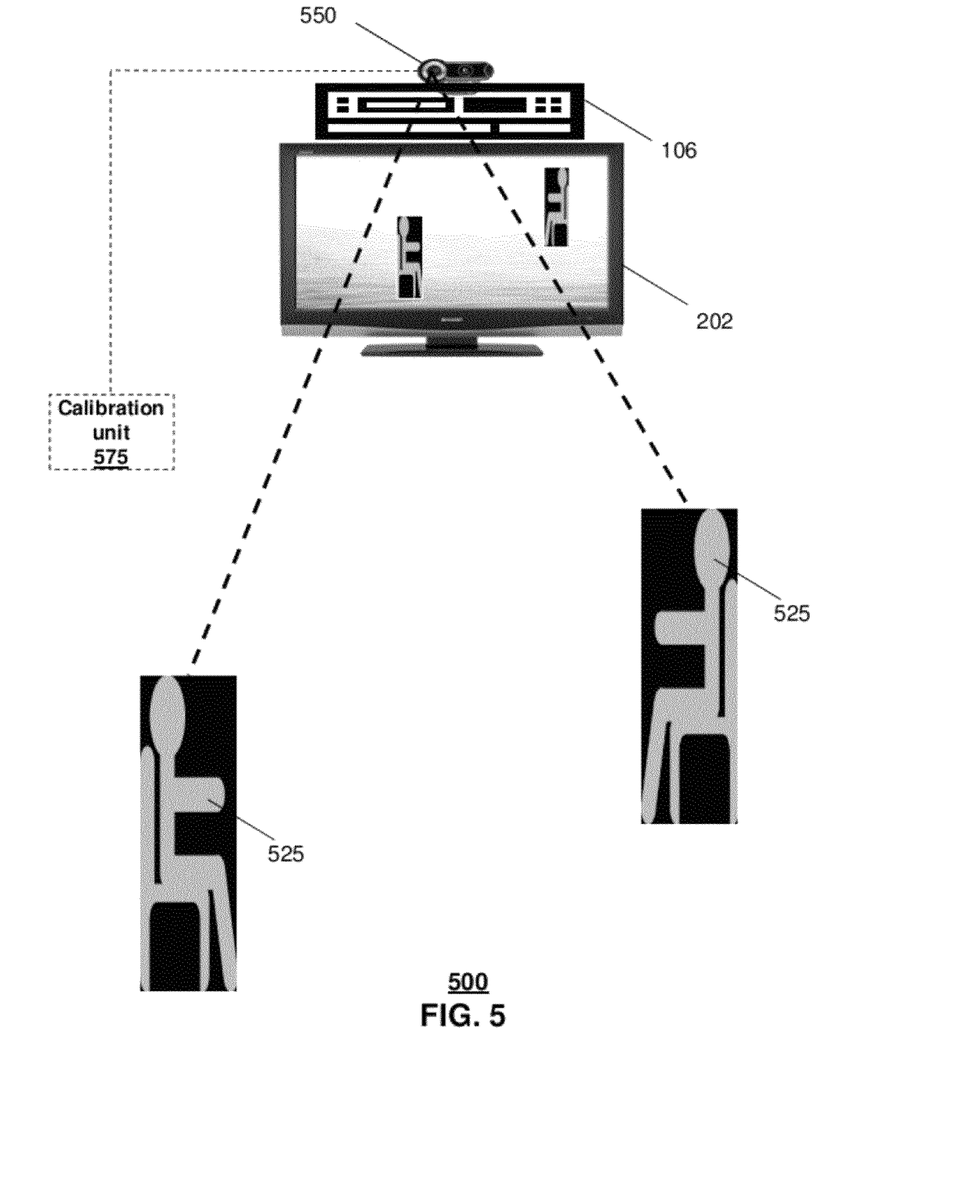
FIGS. 5 and 6 depict illustrative embodiments of communication systems that provide calibration for media services.

FIG. 5 depicts an illustrative embodiment of a communication system 500 that can present calibrated 3D media content to one or more viewers 525. System 500 can be overlaid or operably coupled with the devices and systems of FIGS. 1-4 to receive media content which is presentable as 3D content. System 500 can include a depth camera 550 positioned in proximity to the TV 202. System 500 can also include a calibration unit 575 for receiving position information (such as a distance measurement between the viewer(s) and the TV) from the distance camera 550. In this embodiment, the calibration unit 575 is a separate unit that can communicate with the media processor 106 and/or TV 202 for implementing the convergence adjustment to the 3D media content. However, the calibration unit 575 can be integrated with one or more components of the system 500. For instance, either or both of the media processor 106 and the TV 202 can include hardware and/or software of the calibration unit 575 to make the adjustment to the 3D media content based on the position information. In another embodiment, the distance camera 550 can be integrated with either or both of the media processor 106 and the TV 202 so that the position information gathering, calibration algorithm processing and media content adjustment are performed by a single unit, although distributing the tasks is also contemplated by the present disclosure. The calibration unit 575 can communicate via various means, including wireless, wired, power line communications, and so forth.

In this exemplary embodiment, one or more viewers 525 can sit down or otherwise position themselves for viewing of media content. One of the viewers 525 can depress a 3D Calibrate button, such as on the remote controller 107. In other embodiments, voice activated commands can be received by the remote controller 107, the media processor 106 and/or the TV 202 to initiate the calibration process. In another embodiment, the calibration process can be initiated by the media processor 106 and/or the TV 202, such as after detecting 3D media content to be presented and/or presenting a prompt to the viewers to commence the calibration process. The calibration process can be initiated by, or proceed using, the viewing apparatus 300 as well.

The TV 202 and/or the media processor 106 can instruct the viewer to sit or otherwise position themselves where they will be watching the 3D media content. Using inverse kinematics or other locating techniques, the depth camera 550 can locate the person and can estimate the head/torso positions while indicating them on the screen. The depth camera 550 can measure the distance to the viewer, such as through use of time-of-flight, stereo triangulation, sheet of light triangulation, structured light, interferometry, coded aperture, and so forth. The 3D calibration unit 575 software uses this position information to adjust the convergence of stereoscopic images, which can minimize eye strain for a viewer. In one embodiment, the adjustment to the convergence can be based on a look-up table of distances versus convergence factors. In another embodiment, the convergence adjustment can be performed using an algorithm with the position information, which can also include one or more other factors. The 3D calibration unit 575 can then notify the viewer(s) that calibration is complete, such as by presenting a visual notice on the TV 202 and/or providing an audio message, and so forth.

In one embodiment, where more than one viewer is watching the media content, the calibration unit 575 can utilize all of the position information to adjust the convergence of the media content, such as by averaging the distances. In another embodiment, the position information for multiple viewers can be applied to adjust the convergence based on weighted averages and other factors, including angle of viewing. In yet another embodiment, position information for similarly positioned viewers can be utilized for the convergence adjustment and notification to the other viewers can be provided that there positioning has not been taken into account in the convergence adjustment. Other techniques for adjusting the convergence based on multiple viewers with multiple distances for the TV 202 are also contemplated by the present disclosure.

Figure 6:
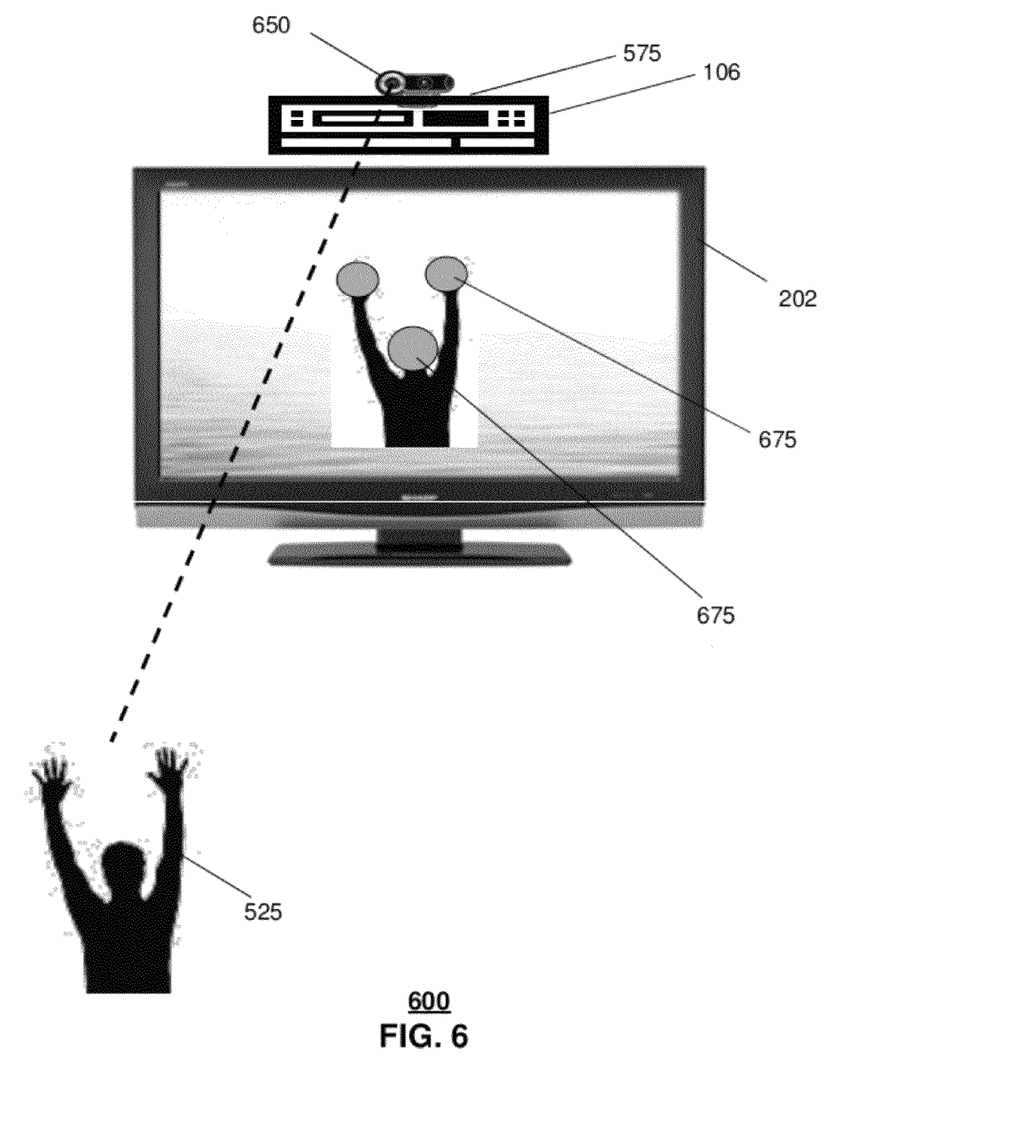

FIG. 6 depicts an illustrative embodiment of another communication system 600 that can present calibrated 3D media content to one or more viewers 525. System 600 can be overlaid or operably coupled with the devices and systems of FIGS. 1-5 to receive media content which is presentable as 3D content. System 600 can include an image camera 650 positioned in proximity to the TV 202. System 600 can also include a calibration unit 575 for receiving position information (such as a distance measurement between the viewer(s) and the TV 202) from the image camera 650. In this embodiment, the calibration unit 575 can be integrated with one or more components of the system 600, such as the media processor 106, although it could be in the TV 202 or a stand-alone device as well. In another embodiment, the image camera 650 can be integrated with either or both of the media processor 106 and the TV 202 so that the position information gathering, calibration algorithm processing and media content adjustment are performed by a single unit, although distributing the tasks is also contemplated by the present disclosure.

In this exemplary embodiment, one or more viewers 525 can sit down or otherwise position themselves for viewing of media content. One or more of the viewers can depress the 3D calibrate button, or the process can otherwise be actuated, including automatic actuation by the calibration unit 575. The calibration unit 575 can instruct the user to sit where they will watch TV, such as through a message displayed on the TV 202. The calibration unit 575 can instruct the user to raise both hands above their head to show the system where they are sitting, such as through another message displayed on the TV 202. The calibration unit 575 can locate the person, estimate the head and hand positions, and indicate them on the screen. The calibration unit 575 can display on the TV 202 hand pads 675, having a known distance spacing between them. The calibration unit 575 can instruct the viewer to move their hands to the point of the hand pads 675, such as through another message displayed on the TV 202. The viewer can then be instructed to relax, while the calibration unit 575 estimates or interpolates the distance to the viewer based on the captured image of the hand movement and the known distance of the hand pads 675. The calibration unit 575 can then adjust the convergence of the stereoscopic images based on this position information, which can minimize eye strain for the viewer. The calibration unit 575 can then notify the viewer that the calibration process has been completed, such as through yet another message displayed on the TV 202. The use of the estimation technique utilizing hand pads 675 or other image markers allows for calibration without the need to provision the user with a distance camera.

Figure 7:
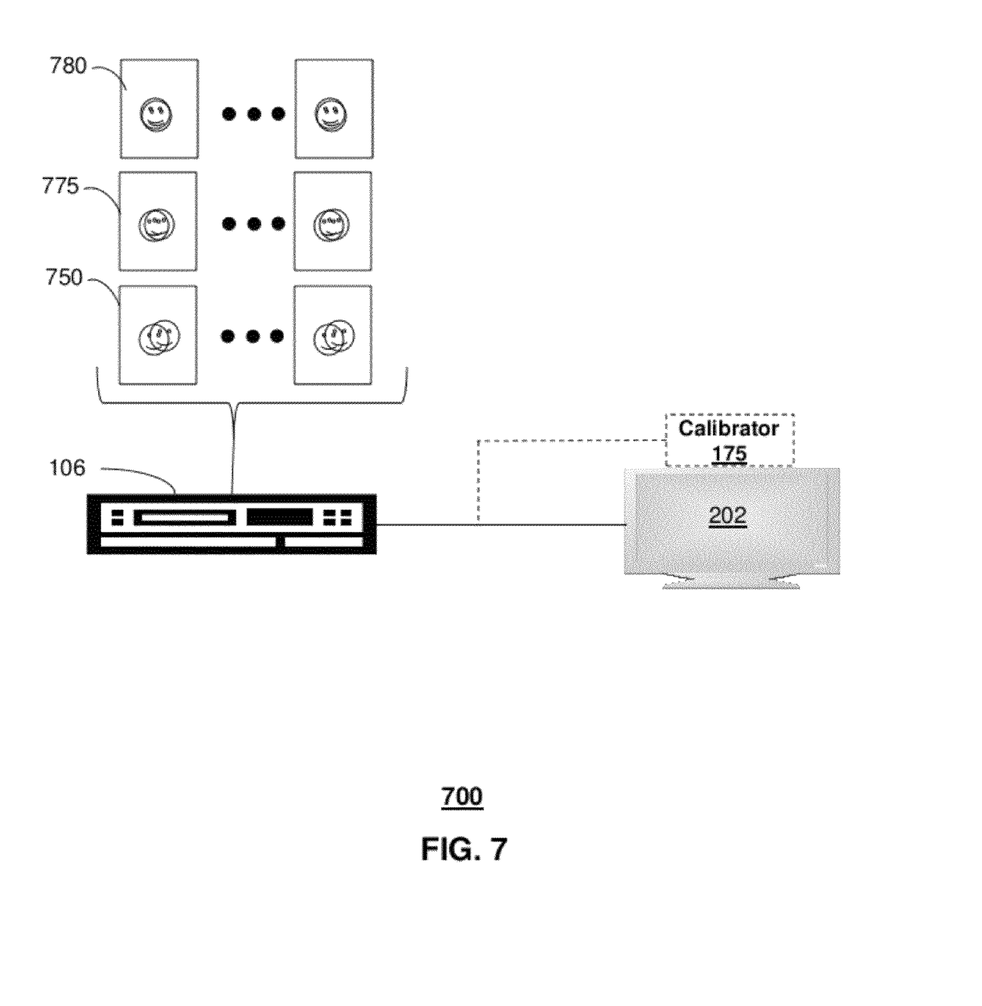
FIG. 7 depicts an illustrative embodiment of a system for adjusting convergence in three-dimensional media content.

FIG. 7 depicts an illustrative embodiment of a communication system 700 that can present calibrated 3D media content to one or more viewers. System 700 can be overlaid or operably coupled with the devices and systems of FIGS. 1-6 to receive media content which is presentable as 3D content. System 700 can include a media processor 106 and a display device, such as TV 202. System 700 can further include calibrator 175 that can utilize position information associated with one or more viewers to adjust 3D media content, such as adjusting a convergence of the media content based on a distance of the viewer(s) from the TV 202. As described above, the calibrator 175 can be a stand-alone device and/or can be integrated into one or both of the media processor 106 and the TV 202. The calibrator can include a camera, such as a distance camera 550 to measure distances and/or an image camera 650 for capturing images of the viewers which can be used for interpolating distances. System 700 allows for adjustment of the convergence, such as based on viewer position information, so that 3D images 750, 775, and 780 can be selectively presented, which each have a different convergence. In one embodiment, a sample of each of the different convergences can be presented to the viewer(s) so that the viewer(s) can make the final determination as to which version should be presented. In another embodiment, where a viewer selects a convergence that does not correspond to their position information, the viewer can be provided with a notice of this discrepancy. In another embodiment, the position information can be based on an outlay of a room or area, such as the location of seats. The calibrator 175 can utilize image recognition techniques to determine seating and then determine position information for the seating, as described above.

Figure 8:
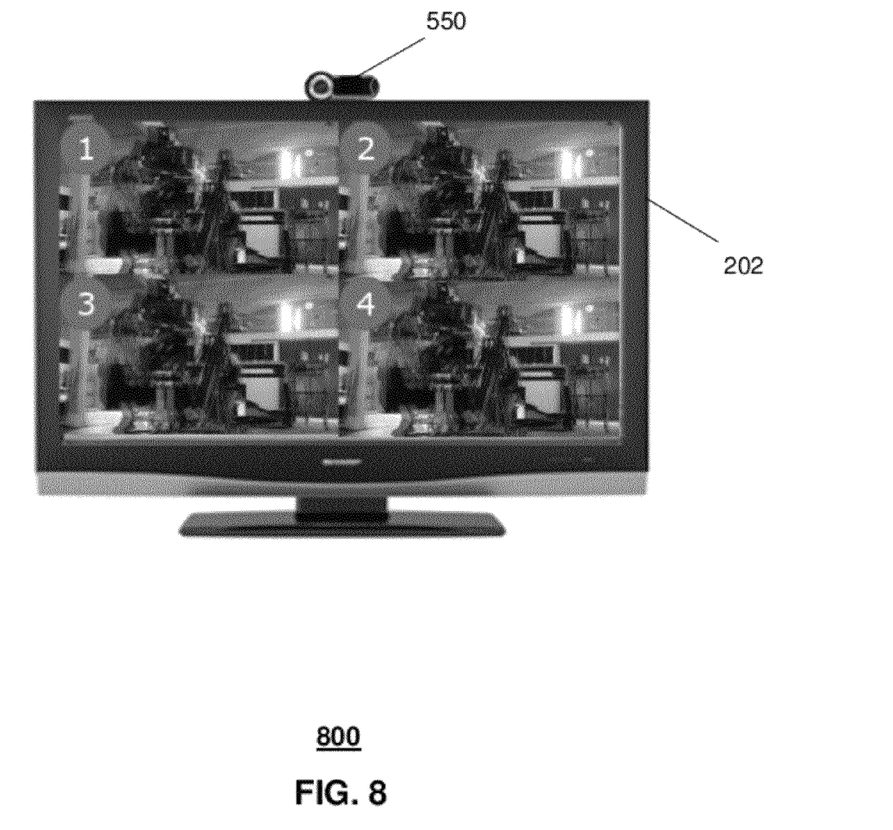
FIG. 8 depicts an illustrative embodiment of a graphical user interface for adjusting convergence in three-dimensional media content.

FIG. 8 depicts an illustrative embodiment of a GUI 800 that can be presented on the TV 202 for performing fine calibration of the 3D media content for one or more viewers. GUI 800 can be used with the devices and systems of FIGS. 1-7. GUI 800 can present samples of 3D images that have been adjusted, such as adjustments to the convergence based on position information associated with the viewers. In this example, the GUI 800 is divided into quarter sections which each include a different sample of the 3D image(s). Samples 1-4 can vary, including slightly, as to convergence and/or other aspects, so that the viewer can select which of the samples they feel provides them with the most desired presentation. The amount of variance of the convergences and/or the other aspects, can be based on a number of factors, including whether there are multiple viewers with multiple position information, and whether one or more of the viewers has a user profile or other preference indicating a desired convergence value. The user profile can include convergence information associated with previously adjusted convergences. In one embodiment, the viewer can be advised of the difference in convergence and/or other aspects of the samples 1-4, such as through data displayed along with each of the samples. In one embodiment, the different samples 1-4 can differ only by convergence. In another embodiment, the different samples 1-4 can have the same convergence but differ as to other aspects.

In one embodiment, the viewer can depress the 3D Calibrate button and select "Fine Calibration." The TV 202 can instruct the viewer to sit where they will watch TV. The viewer can be presented with four images (or another number) with different convergence. The viewer can select the best one based on perception and press the appropriate number key. In a particular embodiment, pressing rewind can return to a previous selection, while pressing fast forward can go to the next selection. Pressing the play button can present the current selection in full screen. Pressing stop can save the current selection for fine adjustment and can exit the 3D calibration mode of GUI 800.

Figure 9:
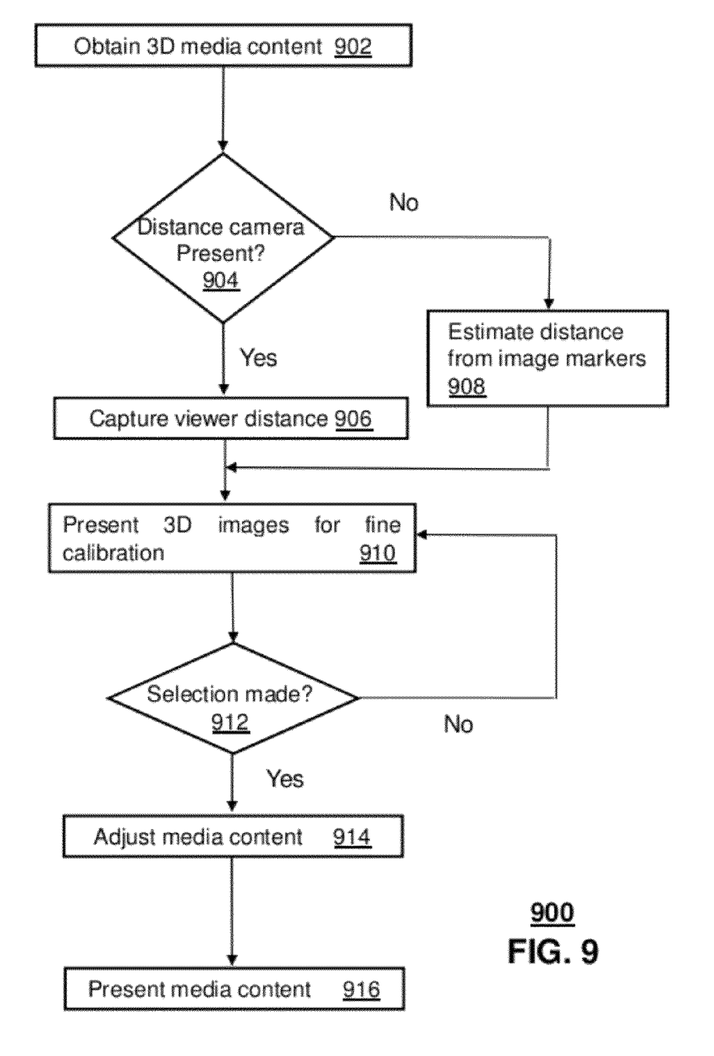
FIG. 9 depicts an illustrative embodiment of a method operating in portions of the devices and systems of FIGS. 1-8.

FIG. 9 depicts an illustrative embodiment of a method 900 operating in portions of the devices and systems described herein and/or illustrated in FIGS. 1-8. Method 900 can begin with step 902 in which 3D media content is obtained by the STB 106. The 3D media content can be received by the STB 106 from various sources, such as via a broadcast over an IPTV network and so forth.

The following method will be described with respect to an STB 106 that has a calibration unit 575, and that is coupled with a display device, such as TV 202. However, it should be understood that method 900 can be performed using various configurations of components, including stand-alone calibration units, TVs with integrated calibration units and so forth. In step 904, the calibration unit 575 can determine whether a distance camera 550 is present so that position information can be measured for the viewer(s). If there is a distance camera 550 then in step 906, the calibration unit 575 can obtain the position information, including the distance between the viewer and the TV 202. The position information can also include other information, such as an angle at which the viewer is positioned with respect to the TV 202.

If there is no distance camera, but there is an image camera 650, then in step 908 the calibration unit 575 can estimate the position information, including the distance between the viewer(s) and the TV 202 using the images marker technique described above with respect to system 600. In step 910, samples of the 3D images can be presented for fine calibration by the viewers, such as described above with respect to GUI 800.

If a selection of one of the samples is made then in step 914 the 3D media content can be adjusted accordingly. For example, if the selected samples designated a particular convergence then the 3D media content can be adjusted using that convergence and presented on the TV 202 in step 916. The particular methodology employed to provide or render the 3D media content can vary and can include active shutter (alternate frame sequencing), polarization and other techniques. The adjustment to the 3D media content can be performed by a number of different devices, including the calibration unit 575, the STB 106 and/or the TV 202.

Upon reviewing the aforementioned embodiments, it would be evident to an artisan with ordinary skill in the art that said embodiments can be modified, reduced, or enhanced without departing from the scope and spirit of the claims described below. The embodiments described above can be adapted to operate with any device capable of performing in whole or in part the steps described for method 900.

In one embodiment, the viewing apparatus 300 can be utilized as part of the calibration process. For instance, the viewing apparatus 300 can provide to the calibration unit 575 position information or data from which position information can be determined. In another embodiment, where there are multiple viewers 525, the calibration unit 575 can adjust the convergence to minimize the effect for the viewer who is sitting in the least desirable position. In another embodiment, where there are multiple viewers 525, the convergence can be adjusted using the multiple position information such that the adjustment to the convergence has the lease impact on all of the viewers 525.

In another embodiment, the calibration unit 575 can dynamically determine convergence information based on changes to a room or other area. For example, the calibration unit 575 can store an image of a current outlay of a room and periodically check to see if there has been any changes to the outlay, such as moving of chairs (e.g., through use of image recognition techniques). If a change has occurred then the calibration unit 575 can perform the calibration process described above, such as without viewers being present, so that the convergence adjustment to any 3D media content can be quickly performed based on pre-determined position information.

Other suitable modifications can be applied to the present disclosure without departing from the scope of the claims below. Accordingly, the reader is directed to the claims section for a fuller understanding of the breadth and scope of the present disclosure.

Figure 10:
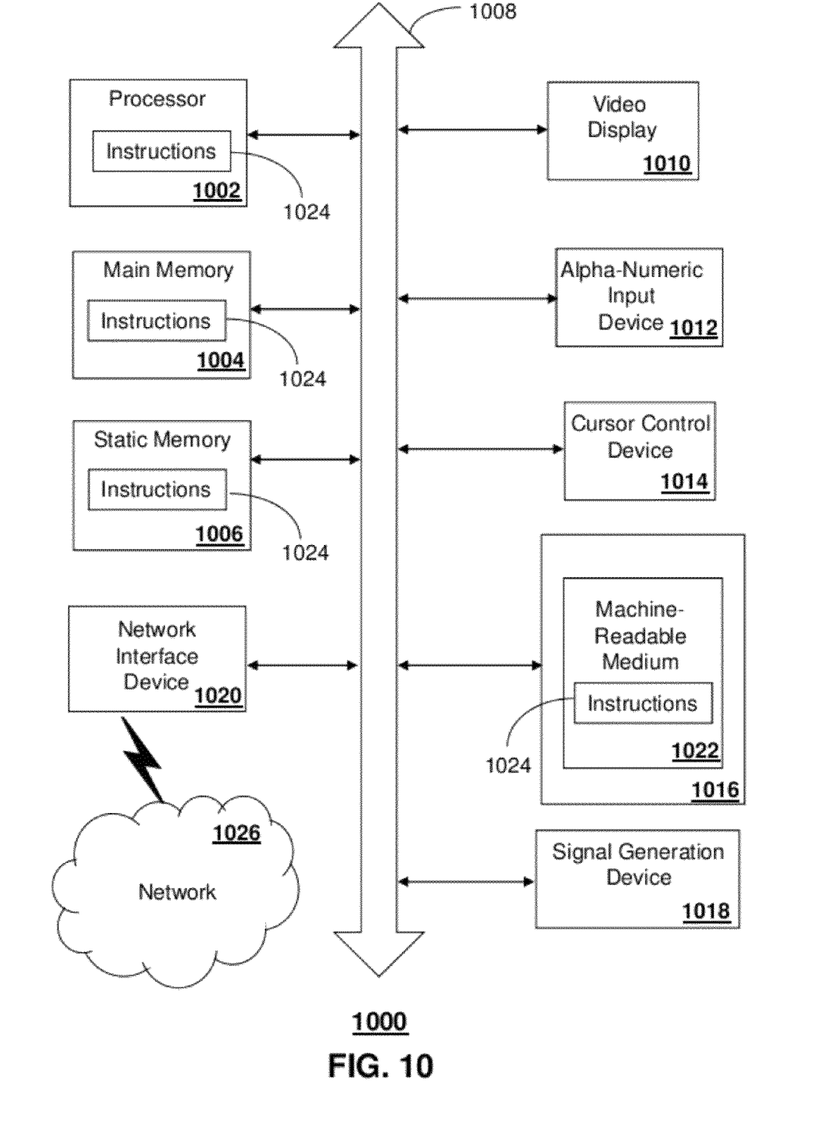
FIG. 10 is a diagrammatic representation of a machine in the form of a computer system within which a set of instructions, when executed, may cause the machine to perform any one or more of the methodologies discussed herein.

FIG. 10 depicts an exemplary diagrammatic representation of a machine in the form of a computer system 1000 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010 (e.g., a liquid crystal display (LCD), a flat panel, a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. The devices of computer system 1000 can be found in the previously shown figures, such as calibrator 175, calibration unit 575, media processor 106, TV 202 and so forth.

The disk drive unit 1016 may include a machine-readable medium 1022 on which is stored one or more sets of instructions (e.g., software 1024) embodying any one or more of the methodologies or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media. The instructions 1024 can include one or more of the steps described above, including calibration steps, such as determining or interpolating viewer distance, determining convergence from viewer distance, and so forth.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1024, or that which receives and executes instructions 1024 from a propagated signal so that a device connected to a network environment 1026 can send or receive voice, video or data, and to communicate over the network 1026 using the instructions 1024. The instructions 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a machine-readable medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP), as well as the examples for calibration, distance determination, communication protocols, and so forth, represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media processor, comprising:
a memory to store instructions; and
a controller coupled to the memory, wherein the controller, responsive to executing the instructions, performs operations comprising:
obtaining three-dimensional media content;
receiving a request to calibrate a display to display the three-dimensional content according to a position of a viewer;
responsive to receiving the request to calibrate:
displaying, on a display device operably coupled to the media processor, an instruction message instructing the viewer to perform a gesture in accordance with a displayed image having a known distance associated therewith; and
capturing an image of the viewer performing the gesture, thereby obtaining position information associated with the viewer, wherein the position information comprises a distance of the viewer from the display device;
adjusting a convergence of the three-dimensional media content based on the position information, resulting in an adjusted convergence, wherein each of a plurality of three-dimensional images of the three-dimensional media content depicts common content with different convergences, which are determined based on the position information, and wherein the adjusting of the convergence of the three-dimensional media content is based on a corresponding convergence associated with one of the plurality of three-dimensional images from the viewer;
providing the three-dimensional media content with the adjusted convergence to the display device for presentation; and
storing the adjusted convergence as a user profile associated with the viewer and the position information.

2. The media processor of claim 1, wherein user profile comprises convergence information associated with the adjusted convergence.

3. The media processor of claim 1, wherein the displayed image comprises separated shapes having a known distance spacing between them, wherein the obtaining of the position information comprises an analysis of the image to determine a distance of hand movement from first hand positions to second hand positions, wherein the second hand positions overlap the separated shapes of the displayed image, and wherein the obtaining of the position information is performed without utilizing a distance camera.

4. The media processor of claim 1, wherein the operations further comprise:
displaying, before the instruction message, on the display device, a location message instructing a viewer of the display device to perform a locating gesture;
estimating head or hand positions of the viewer based on the locating gesture as estimated head or hand positions; and
displaying the estimated head or hand positions on the display device.

5. The media processor of claim 1, wherein the operations further comprise:
obtaining an image of an area in proximity to the display device;
performing image recognition on the image to identify potential seating areas;
obtaining potential position information associated with the potential seating areas; and
generating convergence information based on the potential position information, wherein the convergence information allows for adjusting of three-dimensional media content.

6. The media processor of claim 1, wherein the viewer is one of a group of viewers, and wherein the position information is associated with each of the group of viewers.

7. The media processor of claim 6, wherein the operations further comprise presenting a notice associated with the viewer from the group of viewers that is outside of a desired viewing area, wherein the viewer of the group of viewers is determined based on the position information and the adjusted convergence.

8. The media processor of claim 6, wherein the adjusting of the convergence of the three-dimensional media content for the group of viewers is based on a weighted average of the position information for each of the group of viewers.

9. A non-transitory, machine-readable storage medium, comprising instructions, wherein execution of the instructions causes a processor to perform operations comprising:
obtaining a distance between a viewer and a display device using a calibrator, comprising:
displaying, on the display device, an instruction message instructing the viewer to perform a gesture in accordance with a displayed image having a known distance associated therewith to determine a distance of the viewer from the display device, and
capturing an image of the viewer performing the gesture;
adjusting a convergence of three-dimensional media content based on the known distance, resulting in an adjusted convergence, wherein each of a plurality of three-dimensional images of the three-dimensional media content depicts common content with different convergences, which are determined based on position information, and wherein the adjusting of the convergence of the three-dimensional media content is based on a corresponding convergence associated with one of the plurality of three-dimensional images from the viewer;
providing the three-dimensional media content with the adjusted convergence to the display device for presentation; and
storing the adjusted convergence as a user profile associated with the viewer and the position information.

10. The non-transitory, machine-readable storage medium of claim 9, wherein the operations further comprise:
displaying, on the display device, before the instruction message, a location message instructing the viewer to perform a locating gesture;
estimating head or hand positions of the viewer based on the locating gesture as estimated head or hand positions; and
displaying the estimated head or hand positions on the display device,
wherein the distance is a distance between a hand of the viewer and the display device.

11. The non-transitory, machine-readable storage medium of claim 9, wherein the user profile comprises convergence information associated with the adjusted convergence.

12. The non-transitory, machine-readable storage medium of claim 9, wherein the displayed image comprises shapes corresponding to two hands having a known distance spacing between the two hands as the known distance.

13. A method, comprising:
  obtaining, by a system comprising a processor, three-dimensional media content at a media device;
  displaying, on a display device operably coupled to the processor, an instruction message instructing a viewer of the display device to perform a depth indicating gesture in accordance with a displayed image having a known distance associated therewith to determine a distance of the viewer from the display device;
  capturing, by the system, an image of the viewer performing the depth indicating gesture, thereby obtaining distance information associated with the viewer;
  adjusting, by the system, the three-dimensional media content based on the distance information, resulting in adjusted three-dimensional media content, wherein each of a plurality of three-dimensional images of the three-dimensional media content depicts common content with different convergences, which are determined based on position information, and wherein the adjusting of the convergence of the three-dimensional media content is based on a corresponding convergence associated with one of the plurality of three-dimensional images from the viewer;
  providing, by the system, the adjusted three-dimensional media content to the display device for presentation; and
  storing the adjusted convergence as a user profile associated with the viewer and the position information.

14. The method of claim 13, further comprising storing a user profile associated with the viewer, wherein the user profile comprises convergence information associated with the adjusted convergence.

15. The method of claim 13, further comprising:
  displaying, by the system, on the display device, a locating message instructing the viewer to perform a locating gesture;
  estimating head or hand positions of the viewer based on the locating gesture as estimated head or hand positions;
  displaying the estimated head or hand positions on the display device;
  generating, by the system, a user profile for the viewer;
  storing, by the system, convergence information in the user profile; and
  adjusting, by the system, a convergence of other three-dimensional media content based on the user profile as an adjusted convergence.

16. The method of claim 13, wherein the media device is one of a set top box or a television, wherein the displayed image comprises separated portions, and wherein the known distance associated therewith comprises a distance between the separated portions as displayed on the display device.

17. The method of claim 13, wherein the adjusting of the three-dimensional media content is accomplished in response to a selection by the viewer from among a plurality of three-dimensional images of the three-dimensional media content that have different convergences.

18. The method of claim 13, wherein the displayed image comprises shapes corresponding to two hands having a known distance spacing between the two hands as the known distance.

* * * * *